Nov. 6, 1928.
F. DE WILLY
1,690,814
POWER SUPPLY UNIT FOR RADIO SETS
Original Filed July 2, 1926
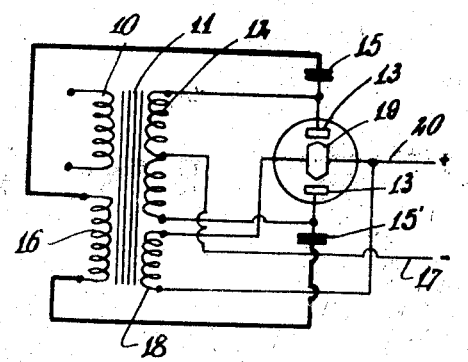
FIG. 1
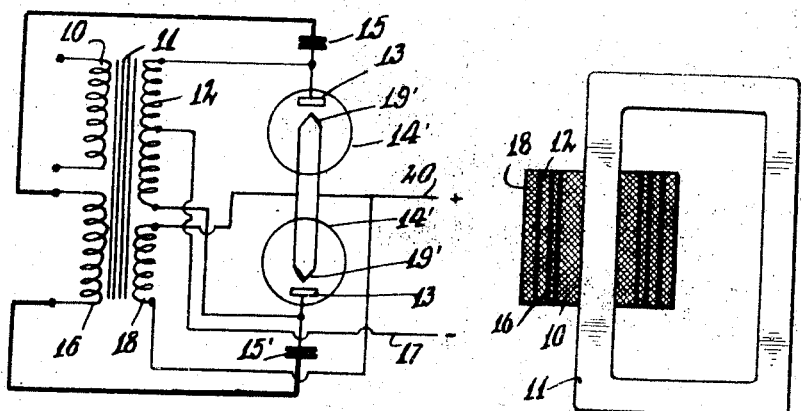
FIG. 2
FIG. 3
INVENTOR
Francis de Willy
BY
ATTORNEY Patented Nov. 6, 1928

1,690,814

UNITED STATES PATENT OFFICE.

FRANCIS DE WILLY, OF NEW YORK, N. Y.

POWER-SUPPLY UNIT FOR RADIO SETS.

Application filed July 2, 1926, Serial No 120,029. Renewed September 27, 1928.

This invention relates generally to power supply units for radio sets, and has more particular reference to a novel means for eliminating noises in the said units.

The invention has for an object the provision of an improved device of the class described which will operate very efficiently, and which can be manufactured and sold at a low cost.

For further comprehension of the invention, and of the objects and advantages thereof, reference will be had to the following description and accompnaying drawing, and to the appended claim in which the various novel features of the invention are more particularly set forth.

Referring to the drawing forming a material part of this disclosure:—

Fig. 1 is a schematic wiring diagram of a power supply unit with associated connections, and the invention applied thereto.

Fig. 2 is a schematic wiring diagram of another power supply unit, specifically of the two tube type, with associated connections, and the invention applied thereto.

Fig. 3 is a sectional view of a coil arranged according to the invention.

Referring in particular to Fig. 1, the reference numeral 10 indicates the primary winding, which is connected to a source of power, preferably a 110 volt A. C. source. The primary winding is wound on a suitable core 11, as shown in Fig. 3. The secondary winding 12 has its ends connected to the plates 13 of the vacuum tube 14, and shunted across the said plates 13, is a circuit including condensers 15 and 15', preferably of 2 u f capacity, and a shielding or absorbing coil 16. The lead 17 is tapped to the secondary winding and connects to the − A or − B terminal of a radio set. Another secondary coil 18 is in a circuit including the filaments 19, while lead 20 branches therefrom and connects to the +A or +B terminal of a radio set.

Fig. 2 differs from Fig. 1 inasmuch as the tube 14 used in Fig. 1 is for rectification of full waves, while to accomplish this purpose in Fig. 2 two tubes 14' are used, each having a filament 19' connected in series with each other.

Referring to Fig. 3, the absorbing winding 16 is shown as placed on winding 10, while winding 12 is placed on 16, and 18 on 12, but the invention is not limited to this particular order. The absorbing winding 16 may be placed between windings 12 and 18, or any desirable position.

The use of an absorbing winding, as described greatly reduces the noises produced by such instruments, such noises presumably being due to distorted interfering electromotive forces.

While I have illustrated and described my invention with some degree of particularity, I realize that in practice various alterations therein may be made. I therefore reserve the right and privilege of changing the form of the details of construction or otherwise altering the arrangement of the correlated parts, without departing from the spirit or the scope of the appended claim.

Having thus described my invention, what I claim as new, and desire to secure by United States Letters Patent is:—

In a device of the class described, the combination with a core having a primary winding adapted to be connected to a source of electrical power, a secondary winding on the primary winding, and shunted across the plates of a rectifying tube, of a circuit shunted across the plates of the rectifying tube, the said circuit including condensers and a shielding coil, and the said shielding coil being placed between the said primary and secondary windings.

In testimony whereof I have affixed my signature.

FRANCIS DE WILLY.